(12) United States Patent
Muta et al.

(10) Patent No.: US 11,498,549 B2
(45) Date of Patent: Nov. 15, 2022

(54) HYBRID VEHICLE AND CONTROL METHOD FOR SAME

(71) Applicant: TOYOTA JIDOSHA KABUSHIKI KAISHA, Toyota (JP)

(72) Inventors: Koichiro Muta, Okazaki (JP); Yukio Kobayashi, Kasugai (JP); Takuro Shimazu, Miyoshi (JP); Yusuke Saigo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 16/832,424

(22) Filed: Mar. 27, 2020

(65) Prior Publication Data

US 2020/0369260 A1 Nov. 26, 2020

(30) Foreign Application Priority Data

May 24, 2019 (JP) .............................. JP2019-097422

(51) Int. Cl.
  *B60W 20/50* (2016.01)
  *B60K 6/24* (2007.10)
  *B60K 6/26* (2007.10)
  *B60W 30/192* (2012.01)

(52) U.S. Cl.
  CPC .............. *B60W 20/50* (2013.01); *B60K 6/24* (2013.01); *B60K 6/26* (2013.01); *B60W 30/192* (2013.01); *B60K 2006/268* (2013.01); *B60W 2510/0676* (2013.01); *B60Y 2200/92* (2013.01)

(58) Field of Classification Search
  CPC .............. B60W 20/50; B60W 30/192; B60W 2510/0676; B60W 2530/211; B60W 2710/0644; B60W 2710/065; B60W 2710/083; B60W 10/06; B60W 10/08; B60W 20/15; B60W 20/40; B60W 30/1884; B60W 20/00; B60W 30/18; B60W 50/0205; B60W 2510/0638; B60K 6/24; B60K 6/26; B60K 2006/268; B60K 6/445; B60Y 2200/92; Y02T 10/62
  See application file for complete search history.

(56) References Cited

U.S. PATENT DOCUMENTS

| | | | |
|---|---|---|---|
| 9,545,916 B2 | 1/2017 | Kamatani et al. | |
| 2004/0149247 A1 | 8/2004 | Kataoka et al. | |
| 2015/0226171 A1 | 8/2015 | Kees et al. | |
| 2019/0249617 A1* | 8/2019 | Crisp | F02P 5/1504 |

FOREIGN PATENT DOCUMENTS

| | | | |
|---|---|---|---|
| JP | H10-169535 A | | 6/1998 |
| JP | 2002-276415 A | | 9/2002 |
| JP | 2005207384 A | * | 8/2005 |
| JP | 2006-194124 A | | 7/2006 |
| JP | 3815441 B2 | | 8/2006 |
| JP | 2009-150301 A | | 7/2009 |
| RU | 2670581 C2 | | 10/2018 |

* cited by examiner

*Primary Examiner* — Brian P Sweeney
(74) *Attorney, Agent, or Firm* — Oliff PLC

(57) ABSTRACT

The hybrid vehicle includes an engine, a motor connected to the engine, and an electronic control unit configured to control the motor to execute motoring to rotate a crankshaft of the engine. The electronic control unit is configured to execute speed-drop offset control when a rotation speed of the engine falls below a first rotation speed that is lower than a self-sustaining rotation speed of the engine while the engine is operated in a self-sustaining manner at the self-sustaining rotation speed.

7 Claims, 12 Drawing Sheets

<MOTORING>

HYBRID VEHICLE AND CONTROL METHOD FOR SAME

INCORPORATION BY REFERENCE

The disclosure of Japanese Patent Application No. 2019-097422 filed on May 24, 2019 including the specification, drawings and abstract is incorporated herein by reference in its entirety.

BACKGROUND

1. Technical Field

The present disclosure relates to a hybrid vehicle and a control method for the hybrid vehicle.

2. Description of Related Art

There has been proposed a technique for detecting misfire of an engine mounted on a hybrid vehicle including the engine and a motor connected to the engine. For example, Japanese Unexamined Patent Application Publication No. 2006-194124 (JP 2006-194124 A) discloses an engine misfire detection device that performs a provisional determination of the engine misfire based on fluctuation of engine rotation. Upon determining through the provisional determination that the engine has misfired, the engine misfire detection device limits operation of the motor and performs a main determination of the engine misfire based on the fluctuation of the engine rotation detected after the limitation.

SUMMARY

During self-sustained operation of the engine, the engine may misfire due to poor combustion of the fuel or the like. If an engine stall occurs due to misfire, the hybrid vehicle may be unable to travel.

The technique of the present disclosure can reduce a possibility of an engine stall due to an engine misfire.

A hybrid vehicle according to a first aspect of the present disclosure includes an engine, a motor connected to the engine, and an electronic control unit configured to control the motor to execute motoring to rotate a crankshaft of the engine. The electronic control unit is configured to execute speed-drop offset control when a rotation speed of the engine falls below a first rotation speed that is lower than a self-sustaining rotation speed of the engine while the engine is operated in a self-sustaining manner at the self-sustaining rotation speed. The speed-drop offset control is control for executing the motoring such that the rotation speed of the engine does not fall below the first rotation speed.

In the above aspect, the speed-drop offset control may be control for executing the motoring such that the rotation speed of the engine does not fall below a second rotation speed that is higher than the first rotation speed and lower than the self-sustaining rotation speed.

In the above configuration, the speed-drop offset control is executed when the engine rotation speed falls below the first rotation speed during the self-sustained operation of the engine. Thus, when a drop in the engine rotation speed is caused by temporary poor combustion of the fuel or the like, the engine is continuously supplied with an amount of air required for the engine to operate in a self-sustaining manner while the drop in the engine rotation speed is suppressed by the motoring, thereby restraining misfire of the engine. Meanwhile, when the combustion state of the engine is improved and stabilized, the engine stall can be restrained. Thus, according to the above configuration, the possibility of the engine stall due to the misfire of the engine can be reduced.

In the above aspect, the electronic control unit may be configured to execute the speed-drop offset control when the rotation speed of the engine falls below the first rotation speed before a reference time elapses from a start of the engine.

The drop in the engine rotation speed due to the poor combustion of the fuel is likely to occur immediately after the start of the engine. When the engine rotation speed drops after a sufficient time has elapsed from the start of the engine, it is relatively likely that the drop in the engine rotation speed occurs due to failure in the engine. As in the above configuration, by limiting an execution timing of the speed-drop offset control to a timing immediately after the start of the engine, the failure in the engine can be detected early.

In the above aspect, the electronic control unit may be configured to end the speed-drop offset control when one of a first end condition and a second end condition is satisfied while executing the speed-drop offset control. The first end condition may be that the rotation speed of the engine has reached a third rotation speed that is higher than the second rotation speed, and the second end condition may be that the rotation speed of the engine has not reached the third rotation speed even after the speed-drop offset control is continued for a predetermined time.

In the above configuration, the speed-drop offset control ends when the first end condition or the second end condition is satisfied. The first end condition is a condition that the engine rotation speed has reached a third rotation speed that is higher than the second rotation speed, and the combustion state of the fuel is stabilized (see FIG. 4 described later). The second end condition is a condition that the engine rotation speed has not reached the third rotation speed even after the speed-drop offset control is continued for the predetermined time, and the combustion state of the fuel is not stabilized (see FIG. 5 described later). In this case, there is a high possibility that a factor other than the poor combustion of the fuel (in short, an engine failure) has occurred. According to the above configuration, when the first end condition is satisfied, the original purpose of the speed-drop offset control can be achieved. When the second end condition is satisfied, although the original purpose of the speed-drop offset control is not achieved, the occurrence of the engine failure can be determined.

In the above aspect, the hybrid vehicle may further include a coolant temperature sensor configured to detect a coolant temperature of the engine. The electronic control unit may be configured to set the second rotation speed such that the second rotation speed increases as the coolant temperature decreases.

With lower coolant temperature of the engine, the poor combustion of the fuel is more likely to occur. In view of this, in the above configuration, the second rotation speed increases as the coolant temperature decreases. Thus, the amount of air supplied to the engine during the execution of the speed-drop offset control increases with lower coolant temperature. This increases the possibility that the combustion state of the engine is improved and stabilized. As a result, according to the above configuration, the engine stall can be more reliably restrained.

In the above aspect, the hybrid vehicle may further include a coolant temperature sensor configured to detect a coolant temperature of the engine. The electronic control unit may be configured to set the reference time such that the reference time increases as the coolant temperature decreases.

In the above configuration, with lower coolant temperature, the poor combustion of the fuel is more likely to occur. Therefore, by setting the reference time longer, a period during which the execution of the speed-drop offset control can be started becomes longer. In this way, by positively securing the opportunity that the speed-drop offset control can be executed at low coolant temperature, the possibility of the engine stall due to the misfire of the engine can be further reduced.

In the above aspect, the hybrid vehicle may further include an alcohol concentration sensor configured to detect an alcohol concentration of a fuel. The engine may be configured to operate with the fuel containing alcohol, and the electronic control unit may be configured to set the second rotation speed such that the second rotation speed increases as the alcohol concentration of the fuel increases.

In general, the higher the alcohol concentration of the fuel is, the lower the volatility of the fuel is and the worse the startability of the engine becomes. Therefore, in the above configuration, the second rotation speed increases as the alcohol concentration of the fuel increases. Accordingly, the higher the alcohol concentration of the fuel is, the larger the amount of air supplied to the engine during the execution of the speed-drop offset control is. This increases the possibility that the combustion state of the engine is improved and stabilized. As a result, according to the above configuration, the engine stall can be more reliably restrained.

In a control method for a hybrid vehicle according to a second aspect of the present disclosure, the hybrid vehicle is configured to execute motoring to rotate a crankshaft of an engine by a motor. The control method includes executing speed-drop offset control when a rotation speed of the engine falls below a first rotation speed that is lower than a self-sustaining rotation speed of the engine while the engine is operated in a self-sustaining manner at the self-sustaining rotation speed. The speed-drop offset control is control for executing the motoring such that the rotation speed of the engine does not fall below the first rotation speed.

According to the above configuration, the possibility of the engine stall due to the misfire of the engine can be reduced.

According to the present disclosure, the possibility of the engine stall due to the misfire of the engine can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
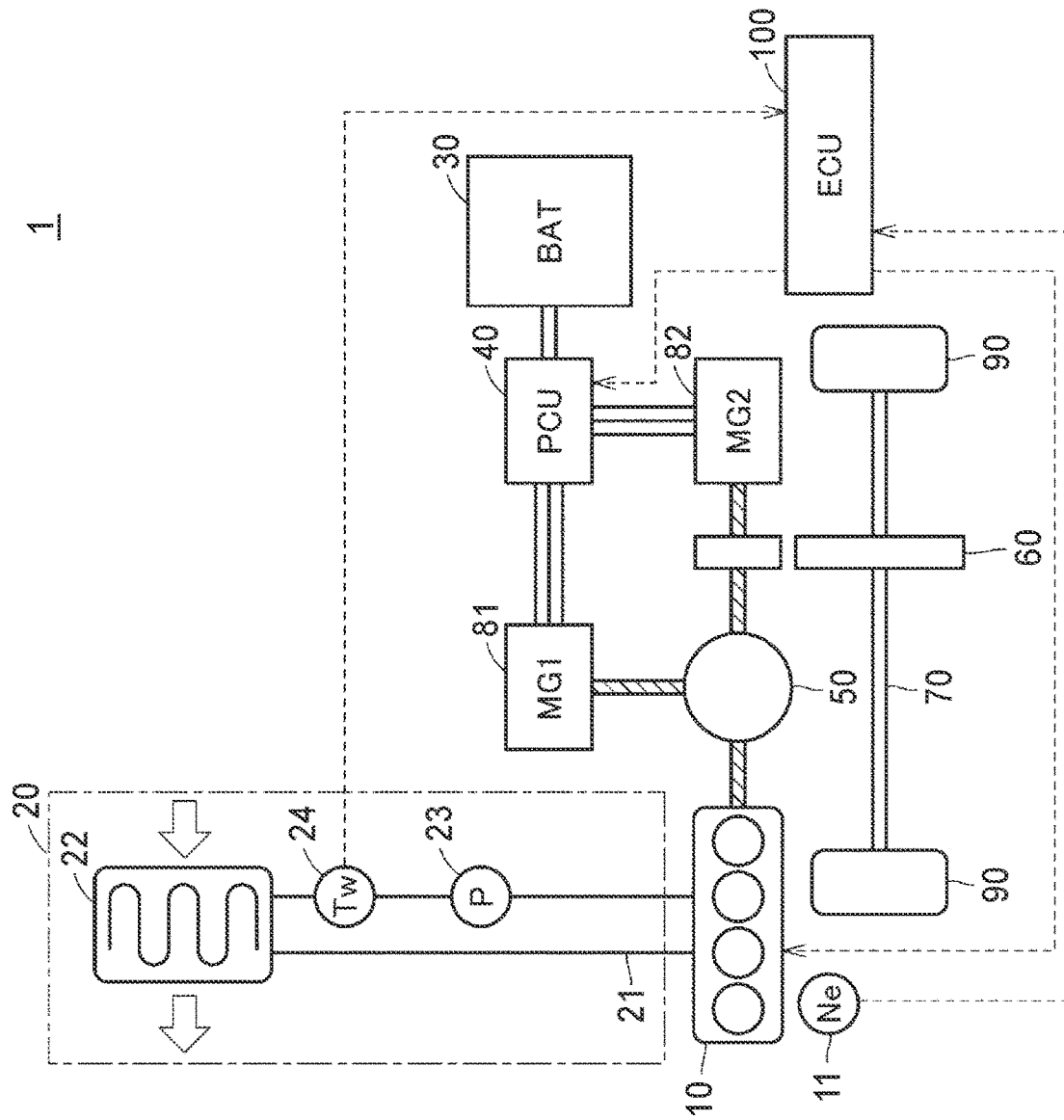
FIG. 1 is a diagram schematically showing a configuration of a hybrid vehicle according to a first embodiment of the present disclosure.

Hereinafter, the present embodiment will be described in detail with reference to the drawings. In the drawings, the same or corresponding portions are given the same reference signs, and description thereof will not be repeated.

First Embodiment: Vehicle Configuration

FIG. 1 is a diagram schematically showing a configuration of a hybrid vehicle according to a first embodiment of the present disclosure. As shown in FIG. 1, a hybrid vehicle 1 includes an engine 10, an engine cooling system 20, a battery 30, a power control unit (PCU) 40, a power split device 50, a reduction gear 60, an axle 70, motor generators 81, 82, wheels 90, and an electronic control unit (ECU) 100.

The engine 10 generates drive force for the wheels 90 by combusting fuel such as gasoline or light oil. The engine 10 operates in accordance with a drive command from the ECU 100. The engine 10 is provided with an engine rotation speed sensor 11. The engine rotation speed sensor 11 measures a rotation speed of the engine 10 (hereinafter referred to as "engine rotation speed Ne"), and outputs a measurement result to the ECU 100.

The engine cooling system 20 includes a coolant pipe 21, a heater core 22, a circulation pump 23, and a coolant temperature sensor 24. Coolant of the engine 10 (engine coolant) flows through the coolant pipe 21. The heater core 22 is a heat exchanger provided part way through the coolant pipe 21. The circulation pump 23 performs a pumping operation so that the engine coolant circulates through the coolant pipe 21. Heat is exchanged when the engine coolant passes through the heater core 22, whereby the engine coolant is cooled. The coolant temperature sensor 24 measures a temperature of the engine coolant (hereinafter also referred to as "coolant temperature") Tw and outputs a measurement result to the ECU 100.

The battery 30 typically includes a rechargeable secondary battery such as a nickel hydride battery or a lithium ion battery. The battery 30 discharges direct current (DC) power to be supplied to the PCU 40 or is charged by DC power supplied from the PCU 40.

The PCU 40 converts the DC power supplied from the battery 30 to alternating current (AC) power, and drives the motor generators 81, 82 with the AC power. Further, the PCU 40 converts the AC power supplied from the motor generators 81, 82 to DC power, and supplies the DC power to the battery 30.

The power split device 50 is configured to be able to split the drive force output from the engine 10 into a drive force that is transmitted to the axle 70 for driving the wheels 90 via the reduction gear 60 and a drive force that is transmitted to the motor generator 81.

The motor generator 81 is rotated by the drive force transmitted from the engine 10 via the power split device 50 to generate power. The power generated by the motor generator 81 is supplied to the PCU 40. The motor generator 81 is also used for "motoring" to rotate a crankshaft of the engine 10. The motoring will be described later. Note that the motor generator 81 corresponds to a "motor" according to the present disclosure.

The motor generator 82 is rotated by the AC power supplied from the PCU 40. The drive force generated by the motor generator 82 is transmitted to the axle 70 via the reduction gear 60. Further, at the time of regenerative braking of the hybrid vehicle 1, the motor generator 82 is rotated along with deceleration of the wheels 90. Electromotive force (AC power) generated by the motor generator 82 is supplied to the PCU 40.

The ECU 100 controls an overall operation of various devices mounted on the hybrid vehicle 1 to cause the hybrid vehicle 1 to travel in accordance with a driver's instruction. The ECU 100 is typically constituted of a microcomputer or the like for executing a predetermined sequence and a predetermined operation programmed in advance.

Motoring

In the hybrid vehicle 1 configured as described above, when a condition for self-sustained operation of the engine 10 is satisfied, the engine rotation speed Ne is increased, by cranking by the motor generator 81, to a rotation speed at which fuel can be combusted. Further, the engine 10 itself increases the engine rotation speed Ne by combusting the fuel. When the increased engine rotation speed Ne exceeds a complete combustion determination rotation speed, the cranking is ended on the assumption that the engine 10 has been started, and thereby the engine 10 is operated in a self-sustaining manner.

During the self-sustained operation of the engine 10, the engine rotation speed Ne may become lower than the normal rotation speed. If the above state is left as it is, the engine 10 may not be able to continue the self-sustained operation, which may cause a misfire. As a result, an engine stall may occur and the hybrid vehicle 1 may become unable to travel. Therefore, in the present embodiment, motoring is performed when the engine rotation speed Ne falls below a predetermined rotation speed during the self-sustained operation of the engine 10.

Figure 2:
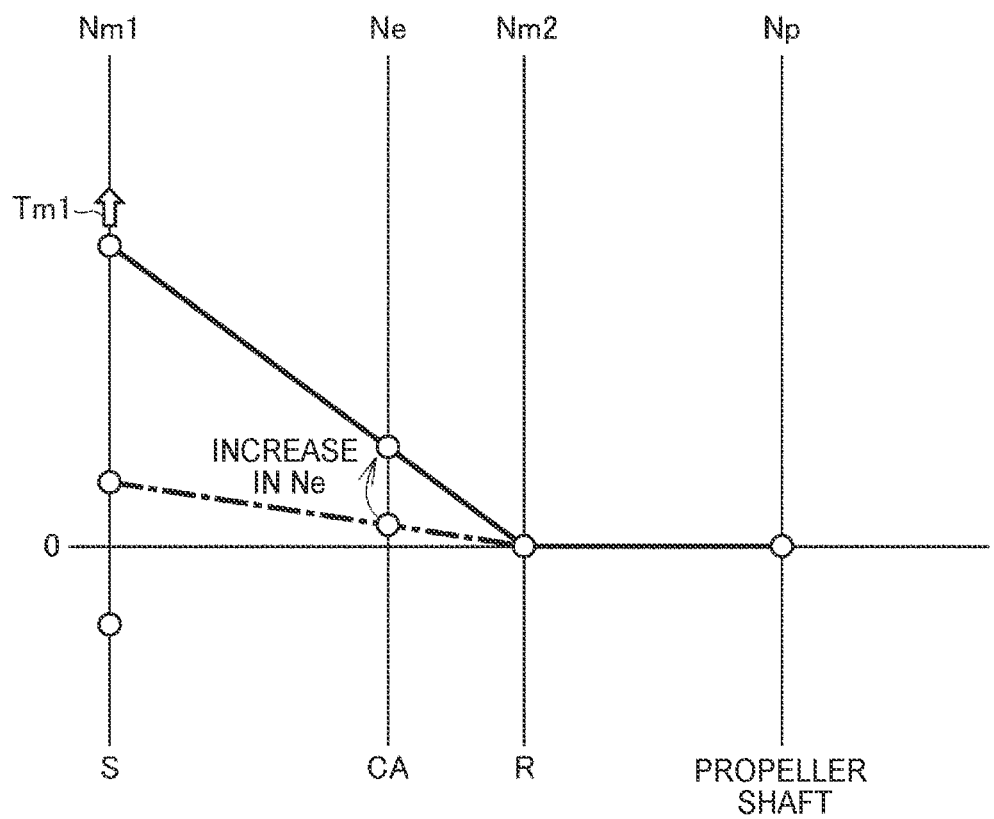
FIG. 2 is a collinear chart showing motoring.

FIG. 2 is a collinear chart showing the motoring. In FIG. 2, a state in which the engine rotation speed Ne drops is represented by a long dashed short dashed line. In the present embodiment, motoring is performed when the engine rotation speed Ne drops and a situation occurs in which the engine 10 may misfire. As represented by a solid line, when the motoring is started, torque Tm1 in a positive direction, which is output from the motor generator 81, is transmitted to the engine 10 to forcibly rotate the engine 10. As described above, by executing the motoring, the engine rotation speed Ne can be increased, and the increased state can be maintained.

There are permanent and temporary causes for the drop in the engine rotation speed Ne during the self-sustained operation of the engine 10. If a permanent abnormality such as a failure occurs in the engine 10, the engine 10 may eventually stall. In contrast, when the drop in the engine rotation speed Ne is caused by temporary poor combustion of the fuel or the like, the engine 10 is continuously supplied with an amount of air required for the engine 10 to operate in a self-sustaining manner while the drop in the engine rotation speed Ne is suppressed by the motoring, which restrains misfire of the engine 10. Meanwhile, a combustion state of the engine 10 may be improved and stabilized. Thus, the engine stall can be restrained.

As described above, in the present embodiment, a drop in the engine rotation speed Ne is offset by the motoring so as to suppress a drop in the engine rotation speed Ne during the self-sustained operation of the engine 10. Hereinafter, this control is referred to as "speed-drop offset control". In the speed-drop offset control, a plurality of rotation speeds serving as references for the engine rotation speed Ne are provided.

Speed-Drop Offset Control

Figure 3:
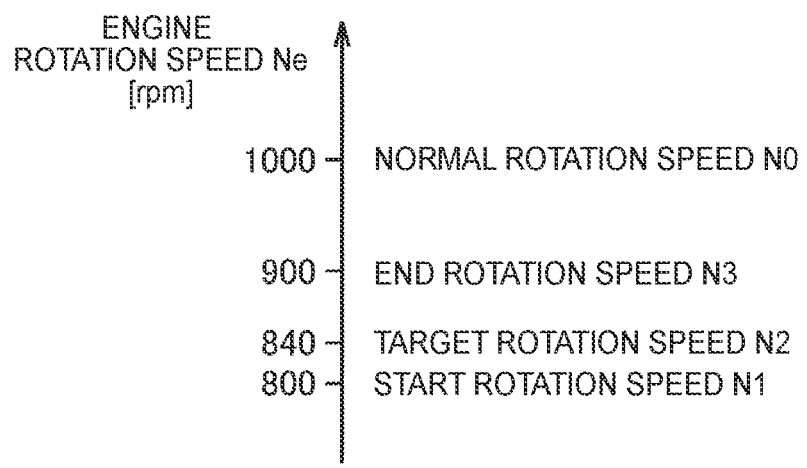
FIG. 3 is a diagram showing an example of a method for setting an engine rotation speed that serves as a reference in speed-drop offset control.

FIG. 3 is a diagram showing an example of a method of setting the engine rotation speed Ne that serves as a reference in the speed-drop offset control. As shown in FIG. 3, when the self-sustained operation of the engine 10 is performed normally (or as usual), the engine rotation speed Ne is set to NO. This engine rotation speed Ne is referred to as "normal rotation speed NO". As an example, the normal rotation speed NO is equal to 1000 rotations per minute (rpm). The normal rotation speed NO corresponds to a "self-sustaining rotation speed" according to the present disclosure.

When the engine rotation speed Ne drops from the normal rotation speed NO and falls below a determination value lower than the normal rotation speed NO, it is determined whether to start the speed-drop offset control. The engine rotation speed Ne used to determine the start of the speed-drop offset control is referred to as "start rotation speed N1". The start rotation speed N1 is, for example, 800 rpm. The start rotation speed N1 corresponds to a "first rotation speed" according to the present disclosure.

In the speed-drop offset control, motoring is performed so that the engine rotation speed Ne is equal to or higher than a target value (so that the engine rotation speed Ne does not fall below the target value). This target engine rotation speed Ne is referred to as "target rotation speed N2". The target rotation speed N2 is higher than the start rotation speed N1, and is, for example, 840 rpm. The target rotation speed N2 corresponds to a "second rotation speed" according to the present disclosure.

Thereafter, when the engine rotation speed Ne exceeds a predetermined value, the control for offsetting a drop in the engine rotation speed Ne by the motoring is ended. The engine rotation speed Ne used to determine the end of the speed-drop offset control is referred to as "end rotation speed N3". The end rotation speed N3 is higher than the target rotation speed N2 and lower than the normal rotation speed NO. The end rotation speed N3 is, for example, 900 rpm. The end rotation speed N3 corresponds to a "third rotation speed" according to the present disclosure.

Figure 4:
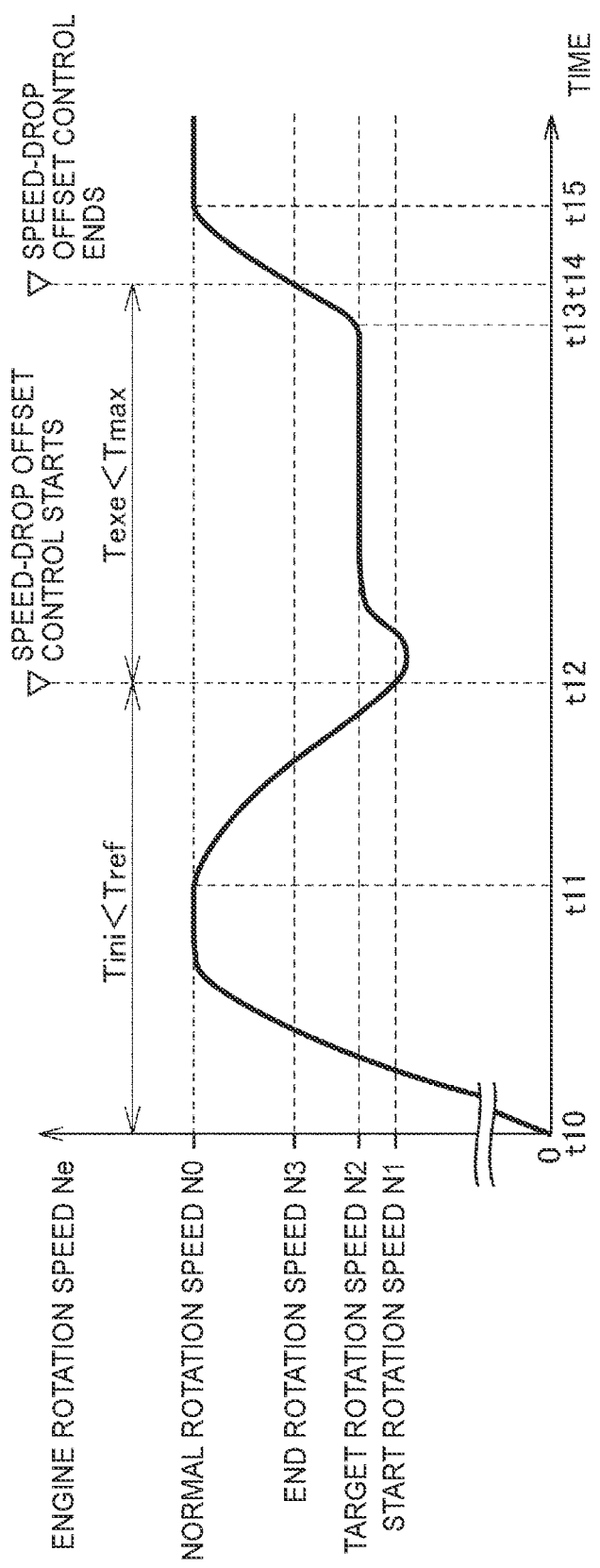
FIG. 4 is a time chart showing an example of a change in the engine rotation speed in the speed-drop offset control.
Figure 5:
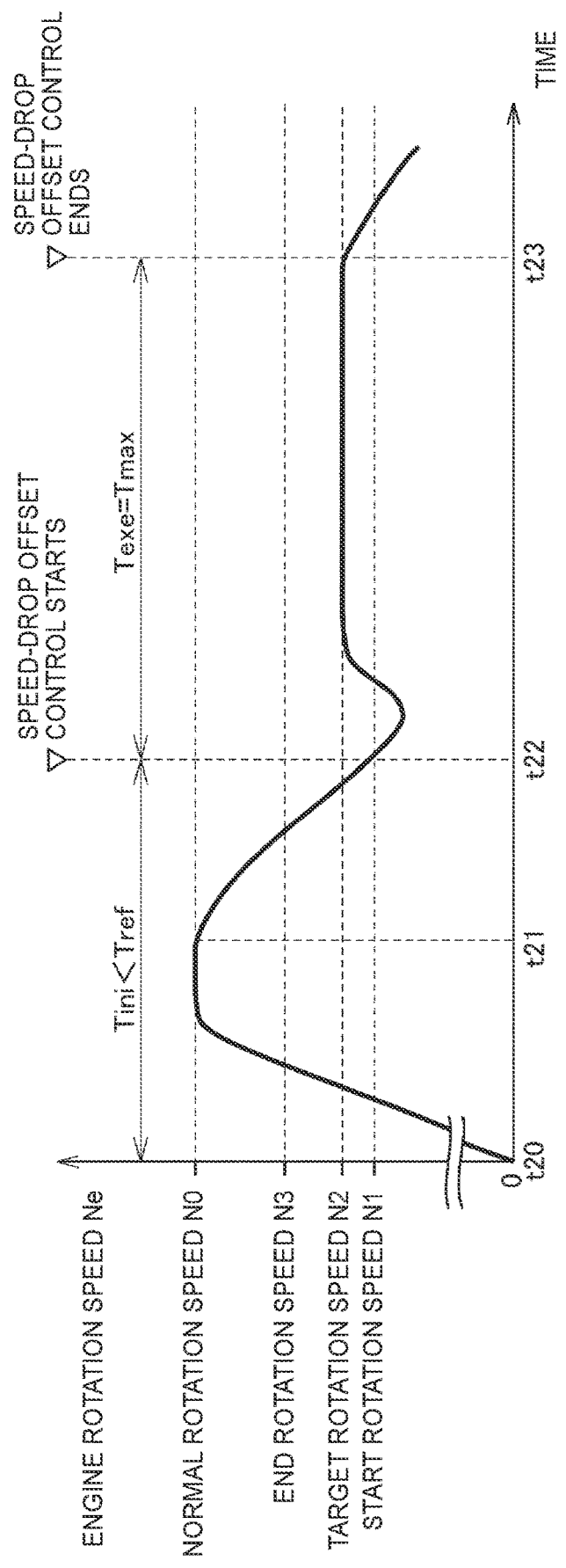
FIG. 5 is a time chart showing another example of the change in the engine rotation speed in the speed-drop offset control.

FIG. 4 is a time chart showing an example of a change in the engine rotation speed Ne in the speed-drop offset control. In FIG. 4 and FIG. 5 described later, a horizontal axis represents an elapsed time from the start of the engine. A vertical axis represents the engine rotation speed Ne [unit: rpm].

As shown in FIG. 4, the engine 10 is started at an initial time t10, and thereafter the engine rotation speed Ne starts to increase. The engine rotation speed Ne then reaches the normal rotation speed N0.

At time t11, the engine rotation speed Ne starts to drop from the normal rotation speed N0, and at time t12, the engine rotation speed Ne falls below the start rotation speed N1. When the elapsed time from the start of the engine (hereinafter also referred to as "start time Tini") is shorter than a predetermined reference time Tref (for example, 3 seconds) and the engine rotation speed Ne falls below the start rotation speed N1, the speed-drop offset control is started.

With the speed-drop offset control, the engine rotation speed Ne is controlled so as not to fall below the target rotation speed N2. An upper limit time is set for the time during which the speed-drop offset control is executed. Hereinafter, the time during which the speed-drop offset control is executed is also referred to as "execution time Texe", and the upper limit time is also referred to as "maximum time Tmax". When the poor combustion of the fuel is eliminated before the execution time Texe reaches the maximum time Tmax, the engine rotation speed Ne increases from the target rotation speed N2 (time t13), and at time t14, the engine rotation speed Ne exceeds the end rotation speed N3. Then, the ECU 100 ends the speed-drop offset control. At this time, since the combustion state of the fuel in the engine 10 is stable, the engine rotation speed Ne continues to increase even after the speed-drop offset control is ended, and reaches the normal rotation speed N0 (time t15).

FIG. 5 is a time chart showing another example of the change in the engine rotation speed Ne in the speed-drop offset control. As shown in FIG. 5, the change in the engine rotation speed Ne from an initial time t20 to time t22 is the same as the change in the engine rotation speed Ne from the initial time t10 to time t12 described with reference to FIG. 4. Thus, the description thereof will not be repeated.

Although the speed-drop offset control is started from time t22, the combustion state of the fuel in the engine 10 may not be stable. As described above, the execution time Texe of the speed-drop offset control is predetermined to be up to the maximum time Tmax (for example, Tmax=5 seconds) at longest. When the engine rotation speed Ne has not reached the end rotation speed N3 even when the speed-drop offset control is continued for the maximum time Tmax, the speed-drop offset control is ended (time t23). In this case, there is a high possibility that a permanent abnormality (failure) has occurred in the engine 10.

As described with reference to FIG. 4, a time when the speed-drop offset control ends with an increase in the engine rotation speed Ne is a time when a "first end condition" according to the present disclosure is satisfied. On the other hand, as described with reference to FIG. 5, a time when the speed-drop offset control ends with the lapse of the maximum time Tmax is a time when a "second end condition" according to the present disclosure is satisfied. It has been described with reference to FIGS. 4 and 5 that the engine rotation speed Ne does not fall below the target rotation speed N2 during the execution of the speed-drop offset control. However, N2 may be set equal to N1, and the motoring may be performed so that the engine rotation speed Ne does not fall below the start rotation speed N1 during the execution of the speed-drop offset control.

Control Flow

Figure 6:
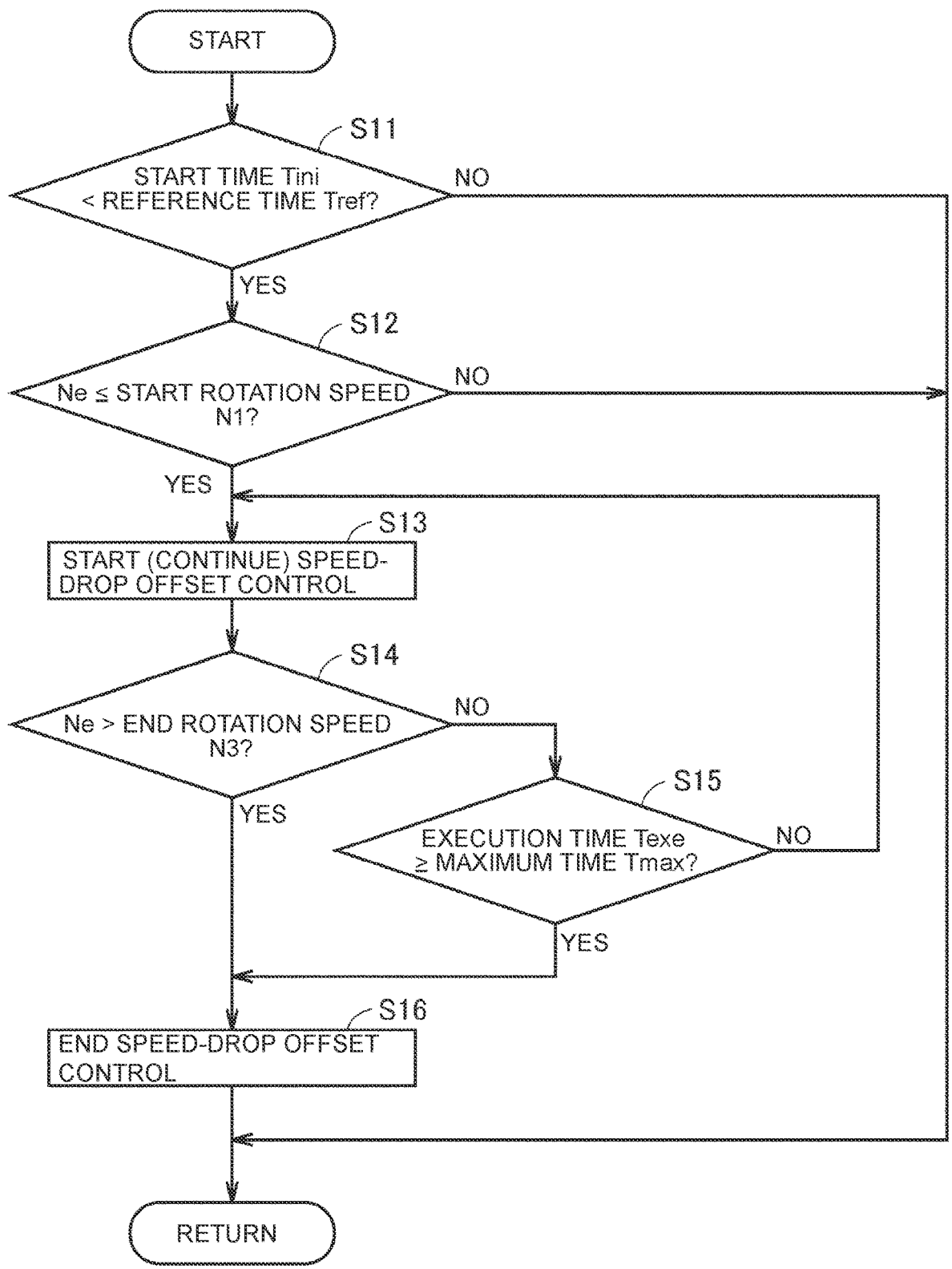
FIG. 6 is a flowchart showing the speed-drop offset control according to the first embodiment.

FIG. 6 is a flowchart showing the speed-drop offset control according to the first embodiment. The processes included in the flowcharts shown in FIG. 4 and FIGS. 8, 10 and 13 described later are called from a main routine (not shown) by the ECU 100 and executed each time a predetermined period elapses during the self-sustained operation of the engine 10. Each step (hereinafter abbreviated as "S") is achieved through software processing by the ECU 100, but may be achieved through hardware processing by an electric circuit prepared in the ECU 100.

As shown in FIG. 6, in S11, the ECU 100 determines whether a start condition for the speed-drop offset control is satisfied. More specifically, the ECU 100 determines whether the start time Tini, which is the elapsed time from the start of the engine 10, is shorter than the reference time Tref (for example, Tref=3 seconds). When the start time Tini is equal to or longer than the reference time Tref (NO in S11), the subsequent processes are not executed and the process returns to the main routine.

When the start time Tini is shorter than the reference time Tref (YES in S11), the ECU 100 proceeds the process to S12. In S12, the ECU 100 determines whether the engine rotation speed Ne is equal to or lower than the start rotation speed N1.

When the engine rotation speed Ne is equal to or lower than the start rotation speed N1 (YES in S12), the ECU 100 executes the speed-drop offset control (S13). That is, the ECU 100 performs motoring by the motor generator 81 such that the engine rotation speed Ne does not fall below the target rotation speed N2.

In S14, the ECU 100 determines whether the engine rotation speed Ne has become higher than the end rotation speed N3. When the engine rotation speed Ne is lower than the end rotation speed N3 (NO in S14), the ECU 100 proceeds the process to S15, and determines whether the execution time Texe, which is the elapsed time from the start of the speed-drop offset control, is equal to or longer than the maximum time Tmax (for example, Tmax=5 seconds). When the execution time Texe is shorter than the maximum time Tmax (NO in S15), the ECU 100 returns the process to S13. Thus, the speed-drop offset control is continued.

In contrast, when the engine rotation speed Ne exceeds the end rotation speed N3 during the execution of the speed-drop offset control (YES in S14), the ECU 100 proceeds the process to S16, and ends the speed-drop offset control. Even when the engine rotation speed Ne is lower than the end rotation speed N3, when the elapsed time (execution time Texe) from the start of the speed-drop offset control is equal to or longer than the maximum time Tmax (YES in S15), the ECU 100 ends the speed-drop offset control (S16). Then, the process returns to the main routine.

As described above, in the first embodiment, when the engine rotation speed Ne falls below the start rotation speed N1 during the self-sustained operation of the engine 10, the ECU 100 executes the speed-drop offset control. More specifically, the ECU 100 increases the engine rotation speed Ne by the motoring so that the engine rotation speed Ne does not fall below the target rotation speed N2. Thereby, the amount of air in accordance with the target rotation speed N2 is continuously supplied to the engine 10. Therefore, when the drop in the engine rotation speed Ne is caused by the temporary poor combustion of the fuel, misfire of the engine 10 is restrained while the drop in the engine rotation speed Ne is suppressed by the motoring. During this time, when the combustion state of the engine 10 returns to normal, the engine 10 completes combustion, and the engine rotation speed Ne stabilizes at the normal rotation speed N0, the engine stall can be restrained (see FIG. 4). Thus, according to the present embodiment, the possibility of the engine stall due to misfire of the engine 10 can be reduced.

In S11, when the elapsed time from the start of the engine 10 is equal to or longer than the reference time Tref (for example, 3 seconds) (NO in S11), the speed-drop offset control is not executed. In other words, in the example shown in FIG. 6, the condition for executing the speed-drop offset control is limited to a timing immediately after the engine is started. This is because the drop in the engine rotation speed Ne due to the poor combustion of the fuel is likely to occur immediately after the start of the engine. When the drop in the engine rotation speed Ne occurs at a timing other than immediately after the start of the engine, it is relatively likely that the drop in the engine rotation speed Ne is caused by the failure in the engine 10. It is not essential to limit the execution timing of the speed-drop offset control to the timing immediately after the start of the engine, but by including this limitation, the failure in the engine 10 can be detected early.

FIG. 1 illustrates an example in which the hybrid vehicle 1 includes two motors (motor generators 81, 82). However, the configuration of a hybrid system is not particularly limited as long as the engine rotation speed Ne can be increased by the motoring. For example, the hybrid vehicle may have a configuration that includes only one motor.

Second Embodiment

It has been described that the drop in the engine rotation speed Ne due to the poor combustion of the fuel is likely to occur immediately after the start of the engine. Such a drop in the engine rotation speed Ne is prominent when the temperature (coolant temperature) Tw of the engine coolant is low. In a second embodiment, a configuration will be described in which the rotation speeds (the normal rotation speed N0, the start rotation speed N1, the target rotation speed N2, and the end rotation speed N3) used for the speed-drop offset control are set in accordance with the coolant temperature Tw. The overall configuration of the hybrid vehicle according to the second embodiment is the same as the overall configuration of the hybrid vehicle 1 according to the first embodiment (see FIG. 1), and thus description thereof will not be repeated.

Figure 7:
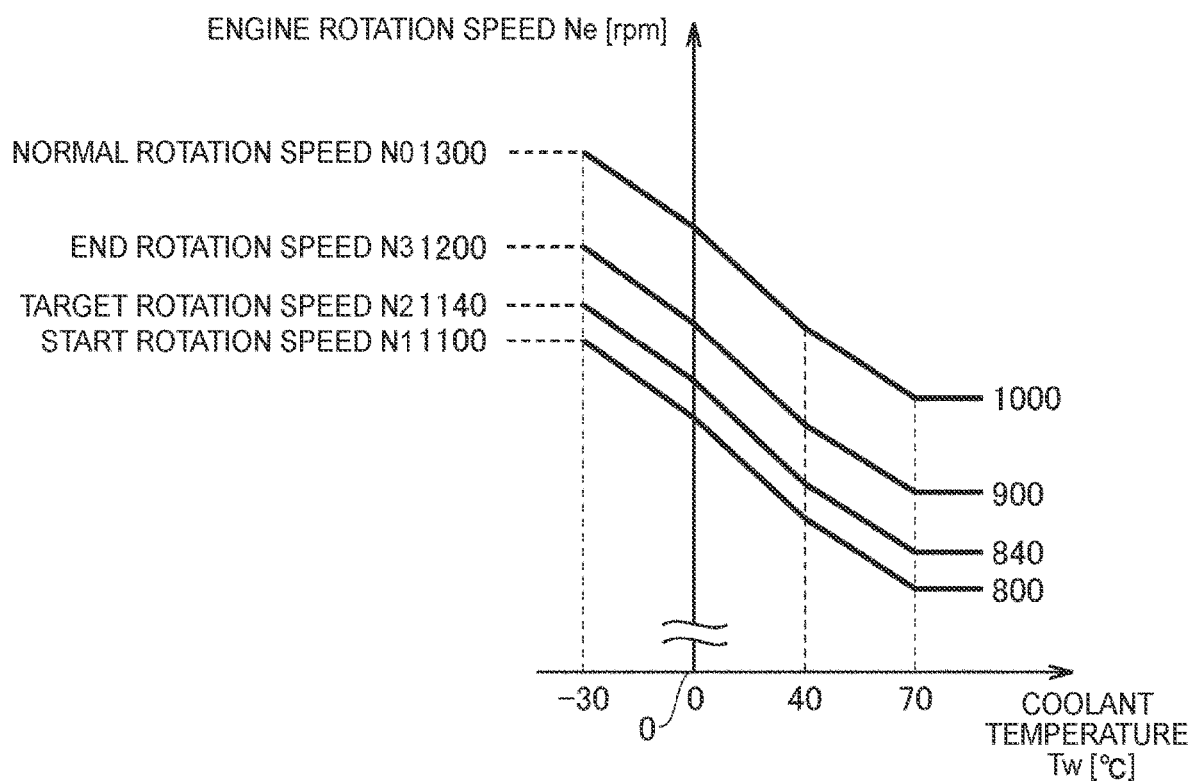
FIG. 7 is a graph showing an example of dependence on coolant temperature regarding a normal rotation speed, a start rotation speed, a target rotation speed, and an end rotation speed according to a second embodiment.

FIG. 7 is a graph showing an example of dependence on coolant temperature regarding the normal rotation speed N0, the start rotation speed N1, the target rotation speed N2, and the end rotation speed N3 according to the second embodiment. In FIG. 7, a horizontal axis represents the coolant temperature Tw [unit: ° C.], and a vertical axis represents the engine rotation speed Ne [unit: rpm].

As shown in FIG. 7, for example, when the coolant temperature Tw is 70° C. or higher, as described in the first embodiment, the normal rotation speed N0 is set to 1000 rpm, the start rotation speed N1 is set to 800 rpm, the target rotation speed N2 is set to 840 rpm, and the end rotation speed N3 is set to 900 rpm.

In contrast, when the coolant temperature Tw is lower than 70° C., the normal rotation speed N0, the start rotation speed N1, the target rotation speed N2, and the end rotation speed N3 are set higher with lower coolant temperature Tw. As an example, when the coolant temperature Tw is −30° C., the normal rotation speed N0 is set to 1300 rpm, the start rotation speed N1 is set to 1100 rpm, the target rotation speed N2 is set to 1140 rpm, and the end rotation speed N3 is set to 1200 rpm.

With lower coolant temperature Tw, the poor combustion of the fuel in the engine 10 is more likely to occur. In view of this, by setting the target rotation speed N2 higher with lower coolant temperature Tw, the amount of air supplied to the engine 10 during the execution of the speed-drop offset control (motoring) increases. This increases the possibility that the combustion state of the engine 10 is improved and stabilized, as compared with the case in which the target rotation speed N2 is constant regardless of the coolant temperature Tw. As a result, the engine stall can be more reliably restrained.

In addition, by setting the start rotation speed N1 higher with lower coolant temperature Tw, the speed-drop offset control is more easily executed. With the start rotation speed N1 set higher, the remaining rotation speeds (the target rotation speed N2 and the end rotation speed N3) are also set higher. As described above, by mitigating the start condition for the speed-drop offset control at low coolant temperature, the possibility of the engine stall due to the misfire of the engine 10 can be further reduced.

Figure 8:
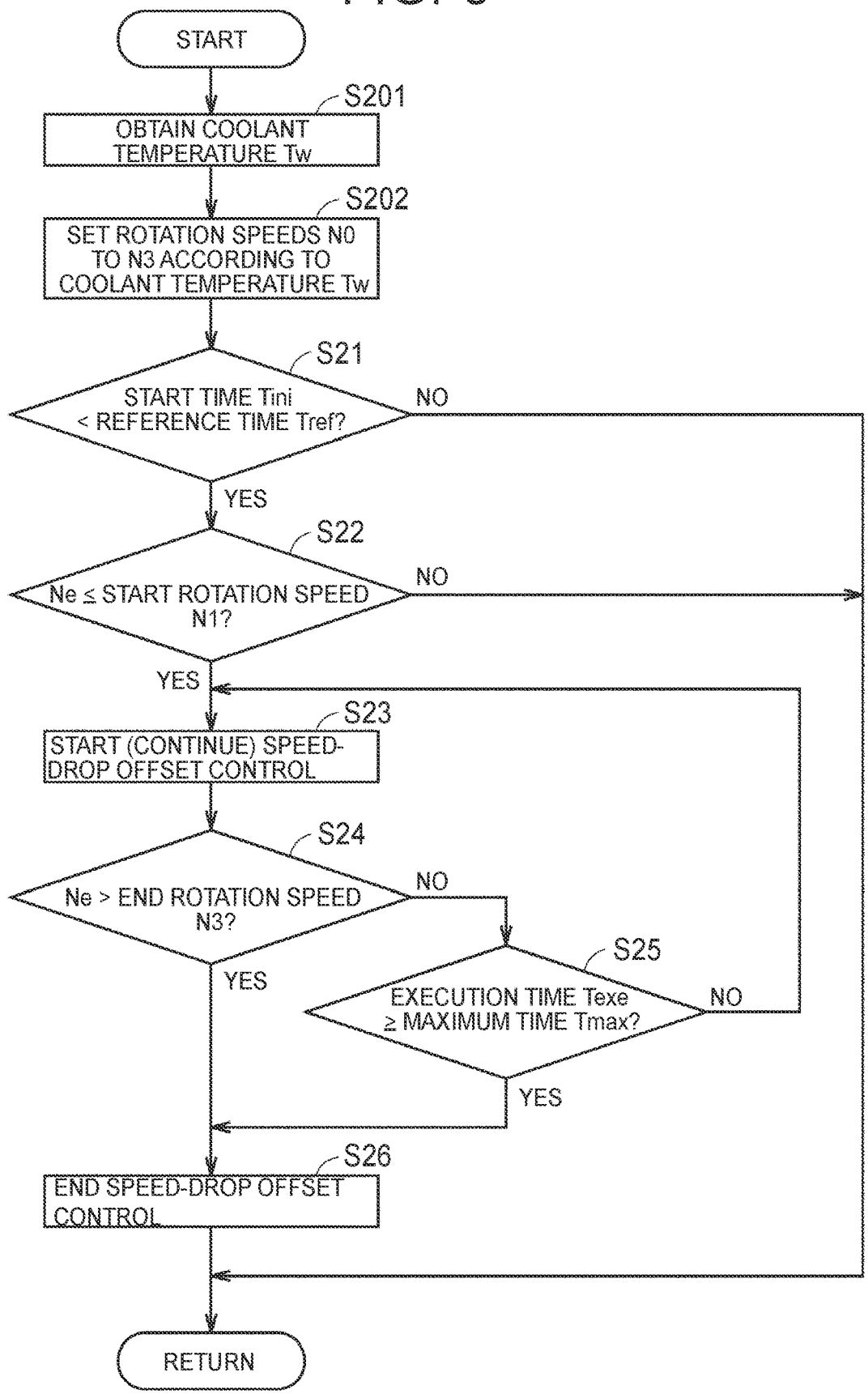
FIG. 8 is a flowchart showing speed-drop offset control according to the second embodiment.

FIG. 8 is a flowchart showing the speed-drop offset control according to the second embodiment. The flowchart in FIG. 8 is different from the flowchart in the first embodiment (see FIG. 6) in that the flowchart in FIG. 8 further includes the processes of S201 and S202.

As shown in FIG. 8, in S201, the ECU 100 receives the temperature (coolant temperature) Tw of the engine coolant from the coolant temperature sensor 24. Then, the ECU 100 refers to a map (see FIG. 7) defining the relationship between the coolant temperature Tw and the normal rotation speed N0, the start rotation speed N1, the target rotation speed N2, and the end rotation speed N3. Thereby, the normal rotation speed N0, the start rotation speed N1, the target rotation speed N2, and the end rotation speed N3 are set in accordance with the coolant temperature Tw (S202). Note that the ECU 100 may store in advance the relationship between the coolant temperature Tw and the rotation speeds as a relational equation or function in a memory (not shown).

Subsequent processes of S21 to S26 are the same as those of S11 to S16 in the first embodiment, and therefore detailed description thereof will not be repeated.

As described above, according to the second embodiment, similarly to the first embodiment, the possibility of the engine stall due to the misfire of the engine 10 can be reduced. Further, in the second embodiment, the normal rotation speed N0, the start rotation speed N1, the target rotation speed N2, and the end rotation speed N3 are set in accordance with the coolant temperature Tw. More specifically, the rotation speeds are set higher with lower coolant temperature Tw. By setting the target rotation speed N2 higher at low coolant temperature, the amount of air supplied to the engine 10 during the execution of the speed-drop offset control at low coolant temperature increases. By setting the start rotation speed N1 higher at low coolant temperature, the speed-drop offset control is executed more frequently at low coolant temperature. Thus, the possibility of the engine stall due to the misfire of the engine 10 can be further reduced.

Third Embodiment

In a third embodiment, in consideration of the prominent drop in the engine rotation speed Ne when the coolant temperature Tw is low, a configuration in which the reference time Tref used for determining the elapsed time from the start of the engine is dependent on the coolant temperature Tw will be described.

Figure 9:
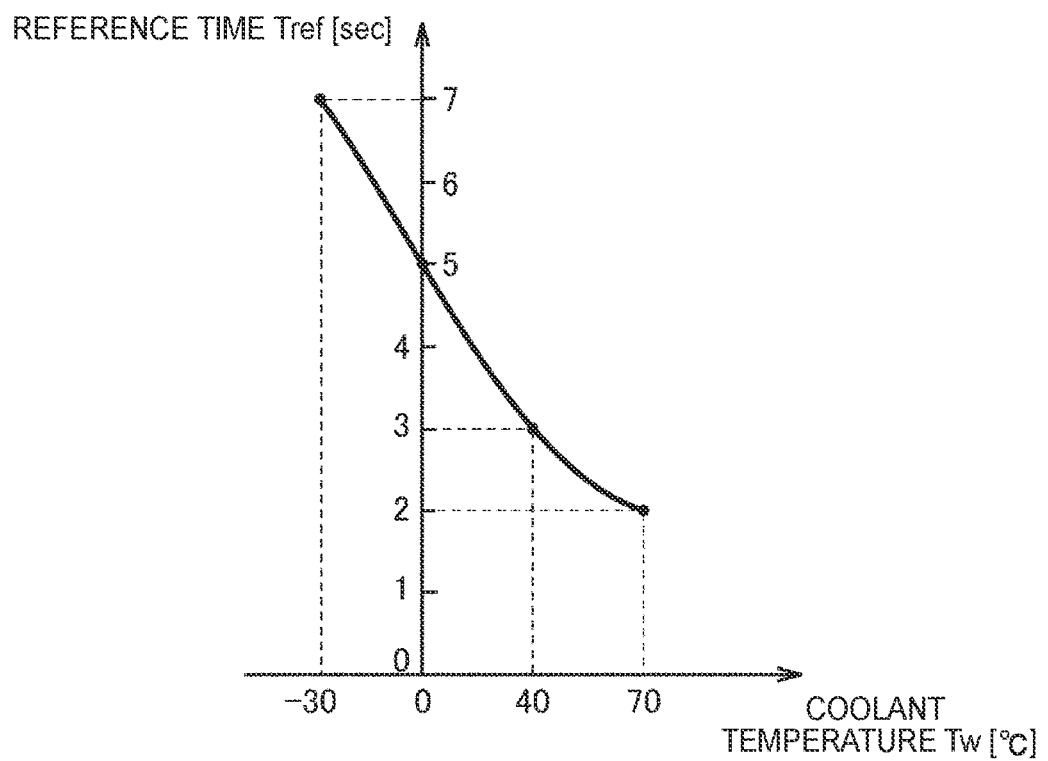
FIG. 9 is a graph showing an example of dependence on coolant temperature regarding a reference time according to a third embodiment.

FIG. 9 is a graph showing an example of dependence on the coolant temperature regarding the reference time Tref according to the third embodiment. In FIG. 9, a horizontal axis represents the coolant temperature Tw [unit: ° C.], and a vertical axis represents the reference time Tref [unit: second].

As shown in FIG. 9, in the third embodiment, the reference time Tref is set longer with lower coolant temperature Tw. For example, as shown in FIG. 9, when the coolant temperature Tw is 70° C., the reference time Tref is set to 2 seconds. When the coolant temperature Tw is 40° C., the reference time Tref is set to 3 seconds. When the coolant temperature Tw is 0° C., the reference time Tref is set to 5 seconds. When the coolant temperature Tw is −30° C., the reference time Tref is set to 7 seconds.

With lower coolant temperature Tw, the poor combustion of the fuel in the engine 10 is more likely to occur. Therefore, by setting the reference time Tref longer, a period during which the execution of the speed-drop offset control can be started becomes longer. As described above, by further positively securing the opportunity that the speed-drop offset control can be executed at low coolant temperature, the possibility of the engine stall due to the misfire of the engine 10 can be further reduced.

Figure 10:
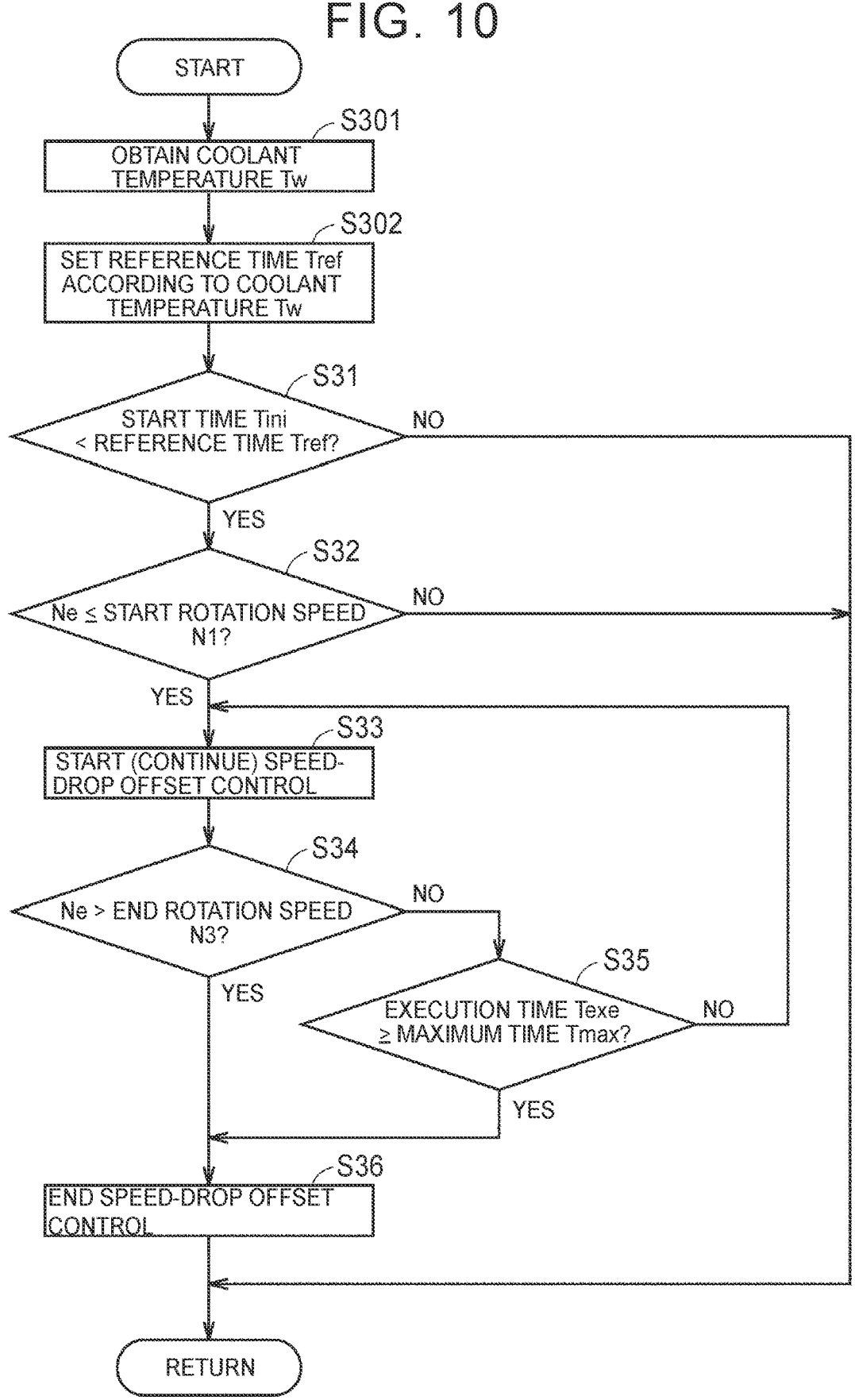
FIG. 10 is a flowchart showing speed-drop offset control according to the third embodiment.

FIG. 10 is a flowchart showing speed-drop offset control according to the third embodiment. The flowchart in FIG. 10 is different from the flowchart in the first embodiment (see FIG. 6) in that the flowchart in FIG. 10 further includes the processes of S301 and S302.

As shown in FIG. 10, in S301, the ECU 100 receives the coolant temperature Tw from the coolant temperature sensor 24. Then, the ECU 100 refers to a map (see FIG. 9) defining the relationship between the coolant temperature Tw and the reference time Tref, thereby setting the reference time Tref in accordance with the coolant temperature Tw (S302). Note that the ECU 100 may store in advance the relationship between the coolant temperature Tw and the reference time Tref as a relational equation or function.

Thereafter, in S31, the ECU 100 determines whether the elapsed time (start time Tini) from the start of the engine is shorter than the reference time Tref. Since the processes of S31 to S36 is the same as the processes of S11 to S16 in the first embodiment, detailed description thereof will not be repeated.

As described above, according to the third embodiment, similarly to the first embodiment, the possibility of the engine stall due to the misfire of the engine 10 can be reduced. Further, in the third embodiment, the reference time Tref is set in accordance with the coolant temperature Tw. More specifically, the reference time Tref is set longer with lower coolant temperature Tw. Longer reference time Tref means that the time during which the speed-drop offset control is allowed to be executed is increased. By securing the opportunity of executing the speed-drop offset control, the possibility of the engine stall due to misfire of the engine 10 can be further reduced.

Although not shown, the second embodiment and the third embodiment may be combined. That is, the normal rotation speed N0, the start rotation speed N1, the target rotation speed N2, and the end rotation speed N3 may be set in accordance with the coolant temperature Tw, and the reference time Tref may also be set in accordance with the coolant temperature Tw.

Fourth Embodiment

There is known an engine that can be operated using a fuel containing alcohol such as ethanol or methanol. In such an engine, a volatility of the fuel differs depending on a concentration of the alcohol contained in the fuel, which may affect the startability of the engine. In a fourth embodiment, a configuration in which the target rotation speed N2 is set in accordance with the alcohol concentration of fuel will be described.

Figure 11:
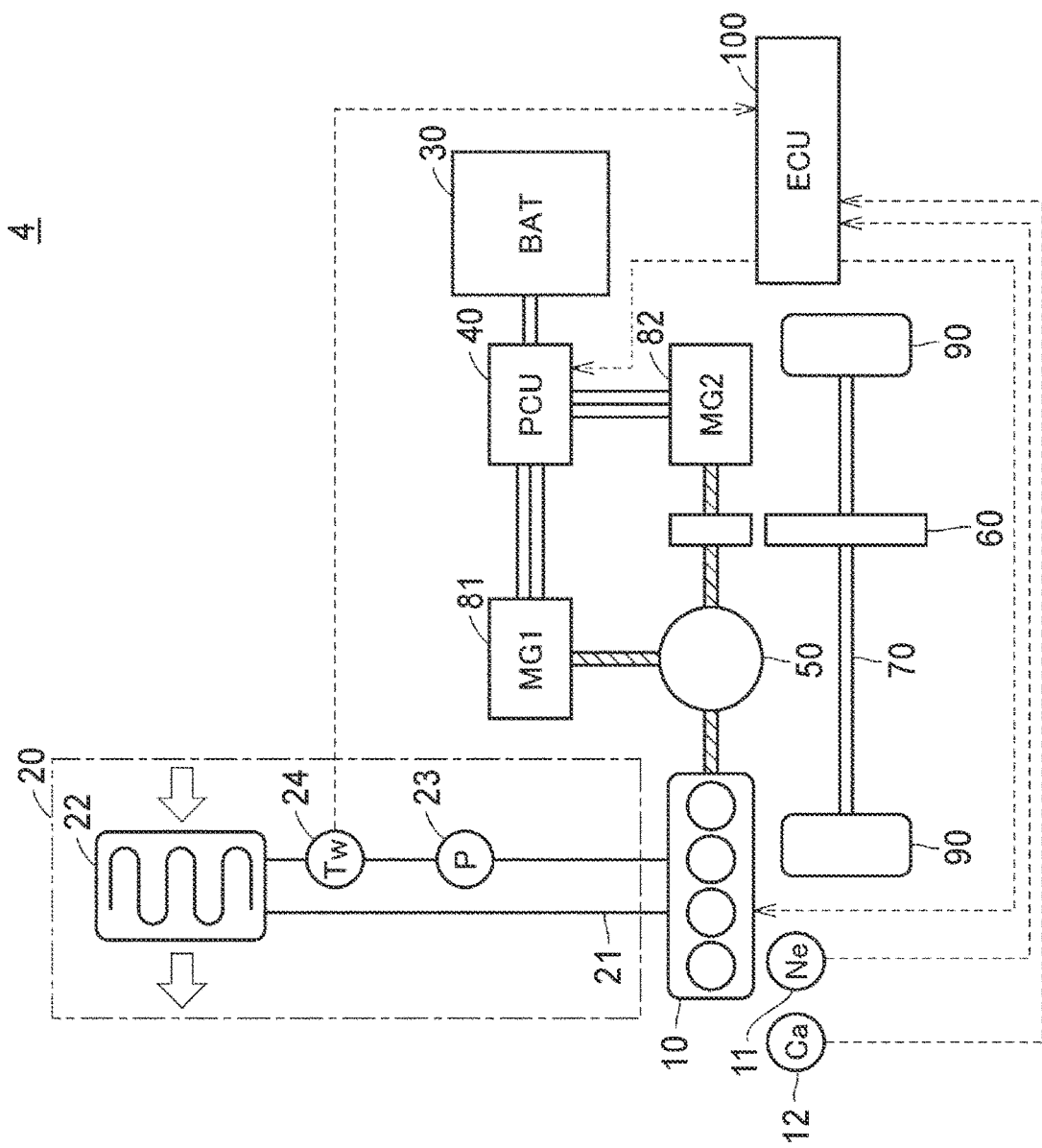
FIG. 11 is a diagram schematically showing a configuration of a hybrid vehicle according to a fourth embodiment.

FIG. 11 is a diagram schematically showing a configuration of a hybrid vehicle according to the fourth embodiment. As shown in FIG. 11, a hybrid vehicle 4 differs from the hybrid vehicle 1 (see FIG. 1) according to the first embodiment in that the engine 10 in the hybrid vehicle 4 is an alcohol-fuel-compatible engine (that is, the vehicle can travel with fuel having different alcohol concentrations) and the hybrid vehicle 4 has an alcohol concentration sensor 12. The alcohol concentration sensor 12 is provided in a fuel path, and outputs a signal corresponding to an alcohol concentration Ca of the fuel to the ECU 100. Other configurations of the hybrid vehicle 4 are the same as those of the hybrid vehicle 1, and therefore description thereof will not be repeated.

Figure 12:
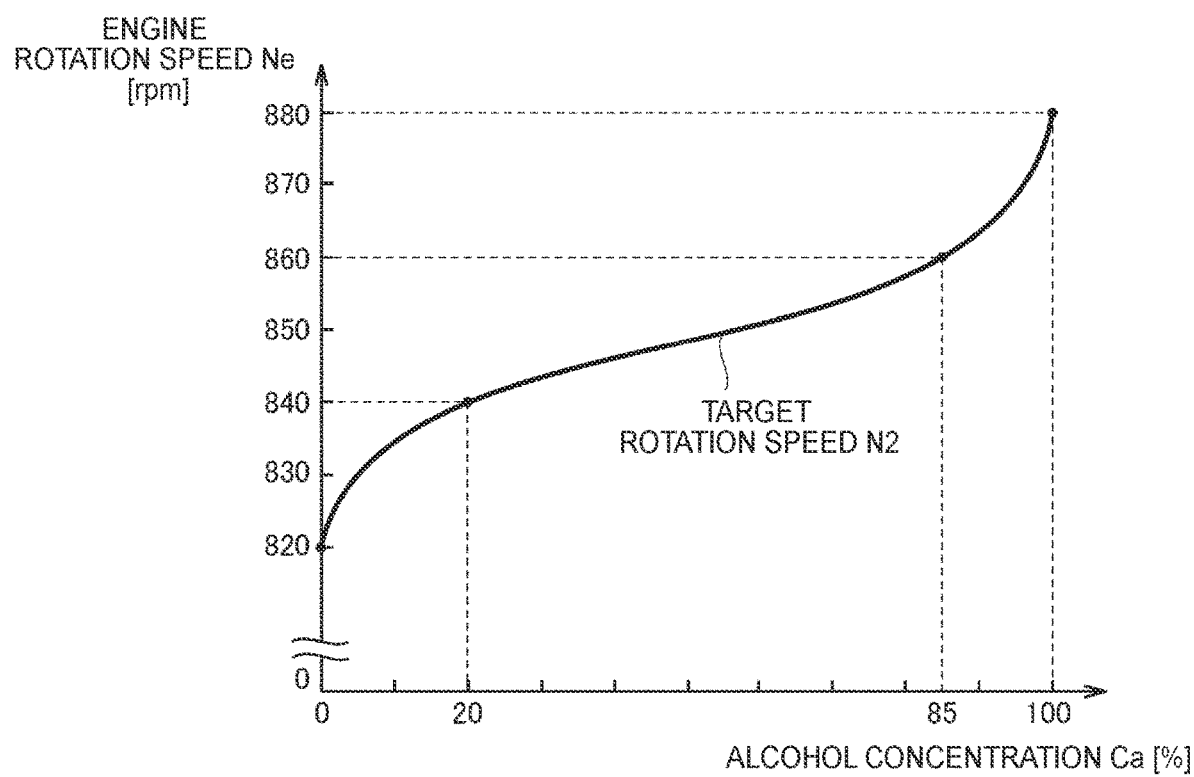
FIG. 12 is a graph showing an example of dependence on alcohol concentration of fuel regarding the target rotation speed according to the fourth embodiment.

FIG. 12 is a graph showing an example of dependence on the alcohol concentration of the fuel regarding the target rotation speed N2 according to the fourth embodiment. In FIG. 12, a horizontal axis represents the alcohol concentration Ca [unit: %] of the fuel, and a vertical axis represents the engine rotation speed Ne (target rotation speed N2) [unit: rpm].

As shown in FIG. 12, in the fourth embodiment, the target rotation speed N2 is set higher with higher alcohol concentration Ca of the fuel. For example, as shown in FIG. 12, when the alcohol concentration Ca is 0%, the target rotation speed N2 is set to 820 rpm. When the alcohol concentration Ca is 20%, the target rotation speed N2 is set to 840 rpm. When the alcohol concentration Ca is 85%, the target rotation speed N2 is set to 860 rpm. When the alcohol concentration Ca is 100%, the target rotation speed N2 is set to 880 rpm.

In general, the higher the alcohol concentration of the fuel is, the lower the volatility of the fuel is and the worse the startability of the engine becomes. Therefore, in the present embodiment, the target rotation speed N2 is set higher with higher alcohol concentration Ca. Accordingly, the higher the alcohol concentration Ca of the fuel is, the larger the amount of air supplied to the engine 10 during the execution of the speed-drop offset control (motoring) is. This increases the possibility that the combustion state of the engine 10 is improved and stabilized, as compared with the case in which the target rotation speed N2 is constant regardless of the alcohol concentration Ca of the fuel. As a result, the engine stall can be more reliably restrained.

Figure 13:
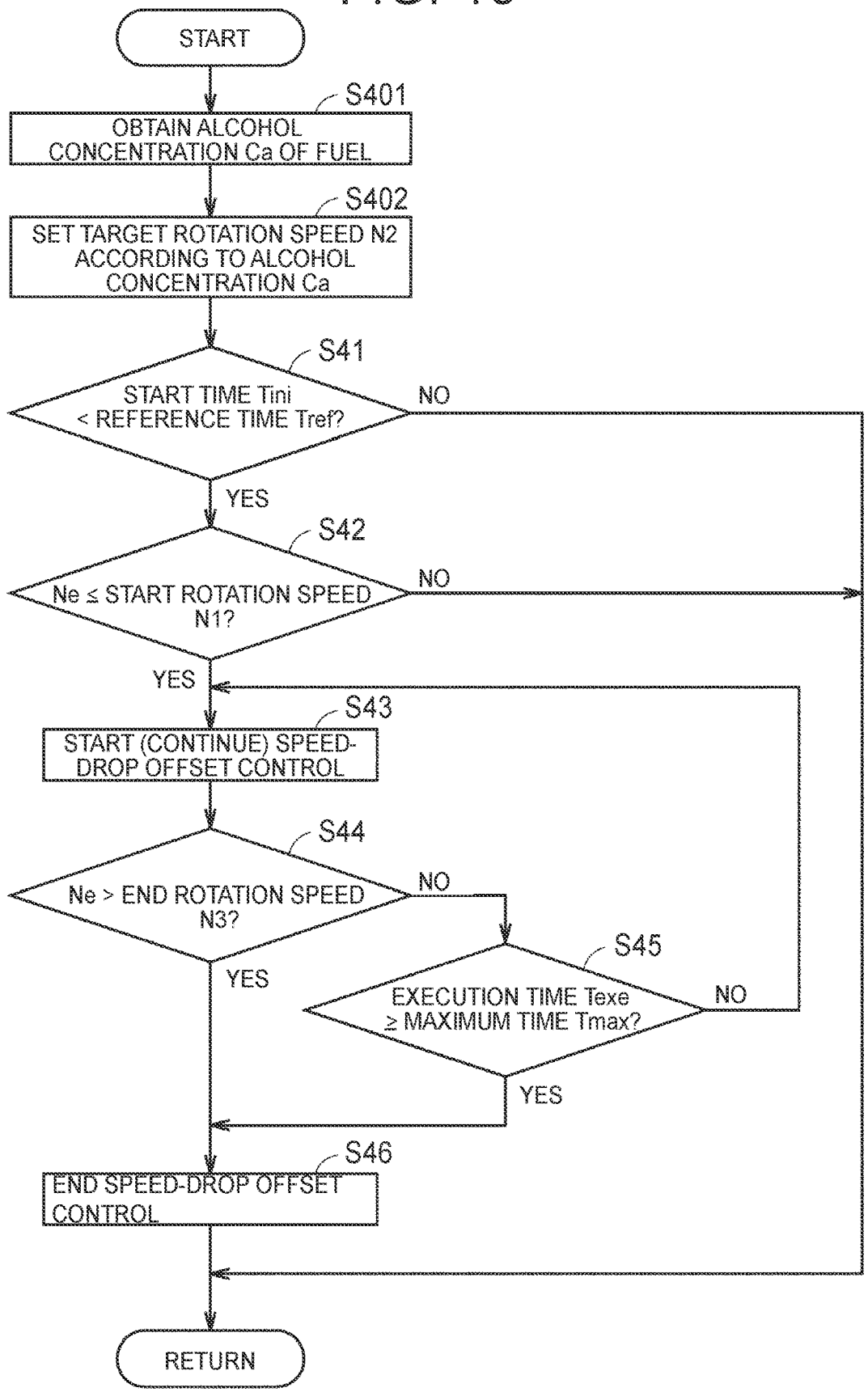
FIG. 13 is a flowchart showing speed-drop offset control according to the fourth embodiment.

FIG. 13 is a flowchart showing speed-drop offset control according to the fourth embodiment. The flowchart in FIG. 13 is different from the flowchart in the first embodiment (see FIG. 6) in that the flowchart in FIG. 13 further includes the processes of S401 and S402.

As shown in FIG. 13, in S401, the ECU 100 receives the alcohol concentration Ca of the fuel from the alcohol concentration sensor 12. Then, the ECU 100 refers to a map (see FIG. 12) defining the relationship between the alcohol concentration Ca and the target rotation speed N2 and sets the target rotation speed N2 in accordance with the alcohol concentration Ca (S402). Note that the ECU 100 may store in advance the relationship between the alcohol concentration Ca and the target rotation speed N2 as a relational equation or function.

Thereafter, in S41, the ECU 100 determines whether the elapsed time (start time Tini) from the start of the engine is shorter than the reference time Tref. Since the processes of S41 to S46 is the same as the processes of S11 to S16 in the first embodiment, detailed description thereof will not be repeated.

As described above, according to the fourth embodiment, similarly to the first embodiment, it is possible to reduce the possibility of the engine stall due to the misfire of the engine 10. Further, in the fourth embodiment, the target rotation speed N2 is set in accordance with the alcohol concentration Ca of the fuel. More specifically, the target rotation speed N2 is set higher with higher alcohol concentration Ca. The higher the target rotation speed N2 is, the larger the amount of air supplied to the engine 10 during the execution of the speed-drop offset control is. Therefore, even when the alcohol concentration Ca is high and the startability of the engine 10 may be deteriorated, the possibility of the engine stall due to the misfire of the engine 10 can be reduced.

In the fourth embodiment as well, with the target rotation speed N2 set higher at low coolant temperature, the remaining rotation speeds (the start rotation speed N1 and the end rotation speed N3) may also be set higher.

The embodiments disclosed above are considered to be illustrative and not restrictive in all respects. The scope of the disclosure is not indicated by the embodiments described above but is indicated by the scope of the claims, and includes any and all modifications within the spirit and the scope equivalent to the scope of the claims.

What is claimed is:

1. A hybrid vehicle comprising:
    an engine;
    a motor connected to the engine; and
    an electronic control unit configured to control the motor to execute motoring to rotate a crankshaft of the engine, wherein the electronic control unit is configured to execute speed-drop offset control when a rotation speed of the engine falls below a first rotation speed that is lower than a self-sustaining rotation speed of the engine while the engine is operated in a self-sustaining manner at the self-sustaining rotation speed, the speed-drop offset control being control for executing the motoring such that the rotation speed of the engine does not fall below the first rotation speed, and the speed-drop offset control being control for executing the motoring such that the rotation speed of the engine does not fall below a second rotation speed that is higher than the first rotation speed and lower than the self-sustaining rotation speed.

2. The hybrid vehicle according to claim 1, wherein the electronic control unit is configured to execute the speed-drop offset control when the rotation speed of the engine falls below the first rotation speed before a reference time elapses from a start of the engine.

3. The hybrid vehicle according to claim 2, further comprising
    a coolant temperature sensor configured to detect a coolant temperature of the engine, wherein the electronic control unit is configured to set the reference time such that the reference time increases as the coolant temperature decreases.

4. The hybrid vehicle according to claim 1, wherein the electronic control unit is configured to end the speed-drop offset control when one of a first end condition and a second end condition is satisfied while executing the speed-drop offset control, the first end condition being that the rotation speed of the engine has reached a third rotation speed that is higher than the second rotation speed, the second end condition being that the rotation speed of the engine has not reached the third rotation speed even after the speed-drop offset control is continued for a predetermined time.

5. The hybrid vehicle according to claim 1, further comprising
    a coolant temperature sensor configured to detect a coolant temperature of the engine, wherein the electronic control unit is configured to set the second rotation speed such that the second rotation speed increases as the coolant temperature decreases.

6. The hybrid vehicle according to claim 1, further comprising
    an alcohol concentration sensor configured to detect an alcohol concentration of a fuel, wherein:
    the engine is configured to operate with the fuel containing alcohol; and
    the electronic control unit is configured to set the second rotation speed such that the second rotation speed increases as the alcohol concentration of the fuel increases.

7. A control method for a hybrid vehicle, the hybrid vehicle being configured to execute motoring to rotate a crankshaft of an engine by a motor, the control method comprising
    executing speed-drop offset control when a rotation speed of the engine falls below a first rotation speed that is lower than a self-sustaining rotation speed of the engine while the engine is operated in a self-sustaining manner at the self-sustaining rotation speed,
    wherein the speed-drop offset control is control for executing the motoring such that the rotation speed of the engine does not fall below the first rotation speed, and
    wherein the speed-drop offset control is control for executing the motoring such that the rotation speed of the engine does not fall below a second rotation speed that is higher than the first rotation speed and lower than the self-sustaining rotation speed.

* * * * *